United States Patent Office 3,317,323
Patented May 2, 1967

3,317,323
DUSTING POWDER AND METHOD FOR FACILITATING THE SEPARATION OF INDIVIDUAL PIECES OF UNBAKED DOUGH
Benjamin Lawrence, Springfield Township, Hamilton County, Ohio, assignor to The Procter & Gamble Company, Cincinnati, Ohio, a corporation of Ohio
No Drawing. Filed Dec. 26, 1963, Ser. No. 333,682
8 Claims. (Cl. 99—90)

This invention relates to a dusting powder for use in coating the surfaces of dough pieces intended for storage in contact with each other in the unbaked state, to dough pieces coated with such a dusting powder and to a process for coating dough pieces with the dusting powder. This invention relates particularly to coating refrigerated biscuit dough.

In the conventional process for processing refrigerated biscuit dough, dough is prepared from the standard ingredients, formed into a sheet by rolls, and the sheet of dough brushed with vegetable oil. The oiled sheet of dough is then cut into biscuit-sized pieces and the pieces dusted with rice flour. The normal level of vegetable oil which is employed is about 0.26% by weight on a finished biscuit basis; rice flour is normally used at a level of about 0.8% by weight on a finished biscuit basis. The biscuit dough pieces are then stacked vertically in a permeable container and the container sealed. These containers are generally constructed from cardboard with a foil layer and sealed with metal ends. Soon after the sealing, a rapid $CO_2$ producing reaction takes place within the container; the reaction provides leavening and at the same time plasters the biscuit dough up against the container wall cutting off the permeability of the container wall by exerting pressure on the foil layer and retaining the formed $CO_2$ within the container to prevent mold growth.

When refrigerated biscuit dough pieces are first placed into contact with each other, they can be esasily separated. The coating of vegetable oil and rice flour applied as described above is intended to provide ease of separation. However, after the dough pieces are in contact with each other for some period of time, they tend to stick together. The resultant poor separation and stickiness are a frequent source of consumer complaints.

A factor influencing dough stickiness is the water level in the dough; the higher the water level in the dough, the greater the tendency toward stickiness. For any given weight refrigerated biscuit, it is desirable to use a high water level since water provides needed moisture content. A method, such as the one hereafter described, which makes possible the use of a higher water level than that conventionally used insures a moist product and also reduces biscuit cost.

Problems similar to those encountered with refrigerated biscuit dough are encountered when any dough pieces, for example, dinner rolls and cinnamon rolls are stored in a refrigerated or unrefrigerated unbaked state in contact with each other.

It is an object of this invention to provide an improved dusting powder to facilitate separation of dough pieces stored for a prolonged period in contact with each other.

It is a further object of this invention to provide a dusting powder for coating dough pieces which will make possible a higher dough moisture content than is now obtainable.

Another object of this invention is to provide dough pieces coated with such a dusting powder and to provide a process for so coating such dough pieces.

It has been found that a dusting powder comprising an edible carrier mixed uniformly with about 0.1% to about 5% by weight of the dusting powder of an edible oxidizing agent facilitates the separation of dough pieces stored for a period of time in contact with each other and allows a higher dough moisture content than is now available. The preferred range of oxidizing agent in the dusting powder is from about 0.2% to about 2% by weight of the dusting powder.

Although any flour may be used as the edible carrier, rice flour is preferred because its large starch granules help to facilitate separation of dough pieces stored in contact with each other. Potassium bromate is the preferred edible oxidizing agent; however, other edible oxidizing agents such as potassium iodate, calcium peroxide, and benzoyl peroxide can be used.

The dough piece is coated with about 2% of its weight of the dusting powder. If more than about 2% is used, the surface of the baked dough piece will have an undesirable white powdery appearance. If much less than about 2% is used, the separating effect will be minimized.

If less than about 0.1% oxidizing agent by weight of the dusting powder is used, the dusting powder will have little separating effect. The use of more than about 5% oxidizing agent by weight of the dusting powder gives rise to possible solids metering problems; the inaccuracy of solids metering devices can give rise to high local concentrations of edible oxidizing agents which may surpass permissible limits and tend to adversely affect the appearance of the surfaces of the dough pieces. The use of more than about 5% oxidizing agent by weight of the dusting powder can further give rise to a reduction in biscuit volume. However, as low as 0.01% oxidizing agent by weight of the dusting powder can be used to coat very dry doughs having an unusually low water level; and up to 25% oxidizing agent by weight of the dusting powder may be necessary for very high water level sticky doughs.

Although it is not intended to be committed to any one particular theory, it is believed that the theory behind the mechanism of stickiness in dough and the prevention of this stickiness is as follows: When pieces of dough, which have not been coated in accordance with the process of the present invention, are first placed into contact with each other, they can be easily separated. During storage, the disulfide S—S bonds in the dough tend to break and new disulfide bonds form across the interface between two adjacent pieces of dough. This new disulfide bonding causes the stickiness. The presence of a high concentration of oxidizing agent across the interface tends to make the original disulfide bonds more stable and thereby reduces the number of new disulfide bonds formed at the interfaces.

The following example is illustrative of the present invention and is not to be construed in any way as limiting the scope of the invention:

Refrigerated biscuit dough was prepared in the usual manner from 3735 gms. of flour, 373 gms. of melted shortening, 110 gms. of sodium acid pyrophosphate, 68 gms. of dextrose, 87 gms. whey solids, 78 gms. salt, 87 gms. soda and 1918 cc. water. The dough was divided into three portions, each of which was dusted with wheat flour and sheeted to a thickness of about 0.5 inch. The dough was sheeted by passing it between metal rollers, and the wheat flour was applied so that the dough would not stick to the metal rollers during the sheeting process.

The sheeted dough was then cut into biscuit-sized pieces with a 1.25 inch major diameter hexagonal cutter. One drop of refined deodorized cottonseed oil was then placed on the top of each biscuit-sized piece with an eye dropper and spread evenly across the surface of the dough piece. The biscuit-sized dough pieces as processed above were divided into three batches for the application of three different dusting powders. About 0.5 gm. of dusting powder were sprinkled on each biscuit-sized piece (weighing about 25 gms.) with an ordinary salt shaker. The dusting powder applied to one batch of the above-described dough pieces comprised rice flour together with 0.2% of the powder's weight of potassium bromate; another batch was dusted with a dusting powder comprising rice flour together with 2% of the powder's weight of potassium bromate; still another batch was dusted with a dusting powder consisting only of rice flour. The dusted biscuit-sized dough pieces were then packed ten to a container. The containers were conventional cardboard tubes sealed at each end with a metal cap. Each container contained dough pieces from a single batch, and the same number of containers were packed for each of the three batches. The containers were then sealed.

Containers of dough pieces from each of the three batches were tested as follows:

(a) A container from each of the three batches was stored for seven days at "cycle" (hereafter to be explained).

(b) A container from each of the three batches was stored for twenty-one days at 40° F.

(c) A container from each of the three batches was stored for forty-two days at 40° F.

After the storage period the containers were opened and the dough pieces graded as to ease of separation.

When the dough pieces were stored at "cycle," they were kept at 40° F. for 5.5 hours. The temperature was gradually raised to 60° F. over the next one-half hour and then kept at 60° F. for the next 5.5 hours. Then over the next one-half hour the temperature was gradually lowered to 40° F. and the process continued for the total storage period. Ease of separation of the dough pieces was graded by a skilled grader using an absolute scale ranging from 0 to 10. At 0 the interface between two dough pieces stored in contact with each other is not distinguishable; the two dough pieces appear as one and when pulled apart the pieces are found to have lost their original identity. At 10 no stickiness at all is distinguishable. The grades between 0 and 10 are degrees of separation between the above-described extremes; the higher the grade the easier the separation. A grade above 6 represents commercial acceptability and a grade of 8 or above represents outstanding separation characteristics.

The following table compares separation grades of dough pieces from each of the above-described three batches. The separation grades listed are average values derived from averaging the grades of all the biscuits in one container. The numerical total of these average grades is also reported.

SEPARATION GRADES

|  | Testing Conditions | | | |
| --- | --- | --- | --- | --- |
|  | 7 days at cycle | 21 days at 40° F. | 42 days at 40° F. | Total |
| Control [1] | 8.3 | 7.0 | 7.0 | 22.3 |
| 0.2% KBrO$_3$ [2] | 8.3 | 7.3 | 7.7 | 23.3 |
| 2.0% KBrO$_3$ [3] | 9.0 | 8.3 | 7.3 | 24.6 |

[1] Dusted with 100% rice flour.
[2] Dusted with a dusting powder comprising rice flour and 0.2% of the powder's weight of potassium bromate.
[3] Dusted with a dusting powder comprising rice flour and 2.0% of the powder's weight of potassium bromate.

As can be seen from the above table the presence of potassium bromate in the dusting powder facilitates ease of separation particularly after prolonged periods of time (20 to 60 days) such as are normally encountered in the commercial production, distribution and sale of refrigerated biscuit dough.

The vegetable oil in the above example can be applied after the dusting powder or can be left out entirely with comparative results.

Potassium iodate, calcium peroxide and benzoyl peroxide can be used in place of potassium bromate in the foregoing example with substantially equal results.

Dinner rolls, cinnamon rolls and other dough products intended for refrigerated or unrefrigerated storage in contact with each other in the unbaked state can be coated with dusting powders as in the foregoing example with equal results.

What is claimed is:

1. A dusting powder for use in coating the surfaces of dough pieces intended for prolonged storage in contact with each other in the unbaked state consisting essentially of rice flour and from about 0.1% to about 5% of the dusting powder's weight of potassium bromate.

2. The dusting powder of claim 1 wherein the potassium bromate ranges from about 0.2% to about 2% of the weight of the dusting powder.

3. The dusting powder of claim 1 wherein the level of potassium bromate is about 0.2% of the weight of the dusting powder.

4. The dusting powder of claim 1 wherein the level of potassium bromate is about 2% of the weight of the dusting powder.

5. In the manufacture of dough products intended for prolonged storage in contact with each other in the unbaked state, the process of coating the surfaces between dough pieces with about 2% by weight of the individual dough pieces of a dusting powder comprising flour and from about 0.1% to about 5% of the weight of the powder of potassium bromate.

6. The process of claim 5 wherein the dusting powder comprises rice flour and from about 0.2% to about 2% of the weight of the powder of potassium bromate.

7. Dough pieces in contact with each other in the unbaked state, having their contacting surfaces coated with about 2% by weight of the individual dough pieces with a dusting powder comprising flour and from about 0.1% to about 5% of the weight of the powder of potassium bromate whereby the separation of such dough pieces is facilitated.

8. The coated dough pieces of claim 7 wherein the dusting powder comprises rice flour and from about 0.2% to about 2% of the weight of the powder of potassium bromate.

References Cited by the Examiner

UNITED STATES PATENTS

| 1,497,477 | 6/1924 | Blouch et al. | 99—93 |
| 2,942,988 | 6/1960 | Erekson et al. | 99—90 X |
| 2,978,332 | 4/1961 | Ferrari | 99—90 X |
| 3,177,081 | 4/1965 | Kleinschmidt et al. | 99—90 X |

A. LOUIS MONACELL, *Primary Examiner.*

J. M. HUNTER, *Assistant Examiner.*